United States Patent [19]

Forte et al.

[11] 4,451,762
[45] May 29, 1984

[54] CONTROL CIRCUIT AND SYSTEM FOR PROVIDING EMERGENCY LIGHTING

[75] Inventors: Don A. Forte, Newark, Ohio; Michael B. Aldava, Tujunga, Calif.

[73] Assignee: Manville Service Corporation, Denver, Colo.

[21] Appl. No.: 389,806

[22] Filed: Jun. 18, 1982

[51] Int. Cl.³ .......................................... H05B 39/10
[52] U.S. Cl. ....................................... 315/87; 315/86; 315/92; 315/162
[58] Field of Search ...................... 315/87, 86, 92, 162

[56] References Cited
U.S. PATENT DOCUMENTS

| 1,753,101 | 4/1930 | Whittingham | 315/87 |
| 3,636,404 | 1/1972 | Appleton | 315/87 |
| 3,699,382 | 10/1972 | Franke | 315/87 |
| 3,783,332 | 1/1974 | Peterson et al. | 315/92 |
| 4,297,614 | 10/1981 | Chandler | 315/86 |

Primary Examiner—Harold Dixon
Attorney, Agent, or Firm—Ronald M. Halvorsen; Cornelius P. Quinn; Timothy R. Schulte

[57] ABSTRACT

A control circuit and system is disclosed for providing emergency lighting from a single source of electrical power which itself is capable of providing input power alternately in the form of a sinusoidal power signal and a square wave power signal during interruption of the sinusoidal power signal. In the preferred form of the invention, a high intensity discharge lamp (HID) and an emergency lamp are provided in the same lighting fixture. A control circuit in the form of a power source detector first detects whether a sinusoidal power signal or a square wave signal is being supplied from a power station onto a pair of input lines. The power station automatically supplies the detector with input power in the form of a square wave rather than the normal sinusoidal power signal when an emergency condition exists such as normal power failure. The detector couples the input power to the HID lamp and the input power is sinusoidal in form and, alternatively, automatically couples the input power to the emergency lamp when the input power is in the form of a square wave.

9 Claims, 3 Drawing Figures

CONTROL CIRCUIT AND SYSTEM FOR PROVIDING EMERGENCY LIGHTING

TECHNICAL FIELD

This invention relates in general to control circuits and systems for use under emergency lighting conditions and, in particular, to control circuits and systems which must operate under emergency operating conditions and which receives power from a single power source.

BACKGROUND ART

Emergency lighting systems are required under a wide variety of operating conditions. One such obvious condition is when there is a power failure. Such an emergency lighting system may be critical in a commercial and/or industrial installation for example where emergency lighting is required for HID (high intensity discharge) installations. Conventional methods for supplying emergency lighting for these applications consists of special emergency inverter systems which run either continuously (UPS type) or ultra-fast switch type (i.e. also referred to as UFS or static switch inverter type).

Both the continuous and ultra-fast switch type, however, are costly and oftentimes unreliable.

Many lighting suppliers manufacture a fixture which has provisions for a main HID lamp and an emergency or auxiliary lamp such as a quartz or tungsten halogen lamp. One system for activating the emergency lamp under emergency lighting conditions is to activate the emergency lamp through the use of an internal time delay relay when power is reapplied to the fixture, thereby giving lighting while the HID lamp restrikes and warms up. However, this system fails to give emergency lighting during power failure itself and only gives emergency lighting after the power failure is over.

A second system for use with such a combined fixture provides power to the emergency lamp during power failure by means of a separate energy power source, either AC or DC. This application requires two sources of power which must be run typically in two separate conduit lines and is consequently expensive.

DISCLOSURE OF THE INVENTION

An object of the present invention is to provide an improved control circuit for use under emergency conditions to energize an emergency lamp during the emergency conditions from the same source of power which energizes the main lamp.

Another object of this invention is to provide an improved control circuit for use under emergency conditions wherein the control circuit supplies input power to an emergency lamp in the form of an emergency power signal and wherein the control circuit also supplies the normal power signal to the main lamp.

A further object of the invention is to provide an improved control circuit for use under emergency conditions which discriminates between normal and emergency power by detecting the presence of emergency power during power interruption and, thereafter, switches the input power from the main lamp to the emergency lamp. When normal power resumes, the control circuit transfers the input power back to the main lamp.

In carrying out the above objects and other objects of this invention, a control circuit is provided for use in a system which provides normal and emergency lighting from a single source of electrical power which is capable of providing input power alternately in the form of a normal power signal and an emergency power signal during interruption of the normal power signal. This system includes a first lamp capable of being energized by the normal power signal and an emergency lamp capable of being energized by the emergency power signal. A control circuit is adapted to alternately receive the normal and emergency power signals. The control circuit comprises a detection circuit for determining which one of the power signals is being received and an electrically controlled switching circuit coupled to the detection circuit for selectively and automatically removing input power from the first lamp and automatically coupling the input power to the emergency lamp during emergency operating conditions.

Further in carrying out the above objects and other objects of the invention, a system is disclosed for providing normal and emergency lighting from a single source of electrical power which is capable of providing input power alternately in the form of normal power signal and emergency power signal during interruption of the normal power signal. The system includes a main lamp which is preferably a high intensity discharge lamp capable of being energized by the normal power signal, an emergency lamp capable of being energized by the emergency power signal and a control circuit adapted to alternately receive the normal and emergency power signals. The control circuit includes a detection circuit for determining which one of the power signals is being received and an electrically controlled switching circuit coupled to the detection circuit for selectively and automatically controlling the input power to the main lamp during normal operating conditions and removing the input power from the main lamp and coupling the power to the emergency lamp during emergency operating conditions. Preferably, the emergency lamp comprised either a quartz lamp or a tungsten halogen lamp. Also, preferably, the system includes a fixture which houses not only the main lamp but also the emergency lamp.

Typically the emergency power signal takes the form of a square wave, however, the present invention can also be used with emergency power signals such as high frequency, DC potential or pulse signals.

The objects, features and advantages of the present invention are readily apparent from the following detailed description of the best mode taken in connection with the accompanying drawings.

BEST MODE FOR CARRYING OUT THE INVENTION

Figure 1:
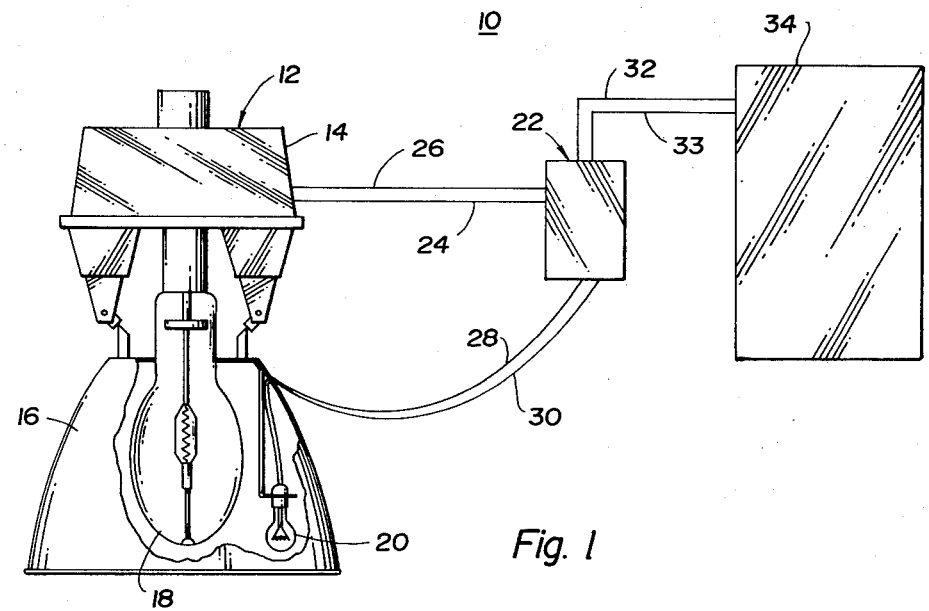
FIG. 1 is a schematic view partially broken away of a control circuit and a system employing the principles of the present invention.

Referring to FIG. 1 there is shown a system and control circuit for providing emergency lighting under emergency conditions such as a power failure. The system is particularly adaptable for use in HID (high intensity discharge) installations wherein the HID lamp and the emergency lamp are provided in the same fixture. However, the system of the present invention is not limited to such installations but also is applicable when it is necessary to switch between different lighting modes under emergency conditions.

The lighting system of FIG. 1 is collectively indicated by reference numeral 10. The lighting system 10 includes a lighting unit, generally indicated at 12 which includes a housing 14 and a prismatic glass reflector with an aluminum cover 16. Typically, the lighting unit 12 also includes a ballast which in a preferred embodiment of the present invention comprises an HID ballast for providing the energizing current to a main or HID lamp 18 suspended within the unit 12. An emergency lamp 20 is also suspended in the lighting unit 12 and preferably comprises a quartz or tungsten halogen lamp.

Figure 2:
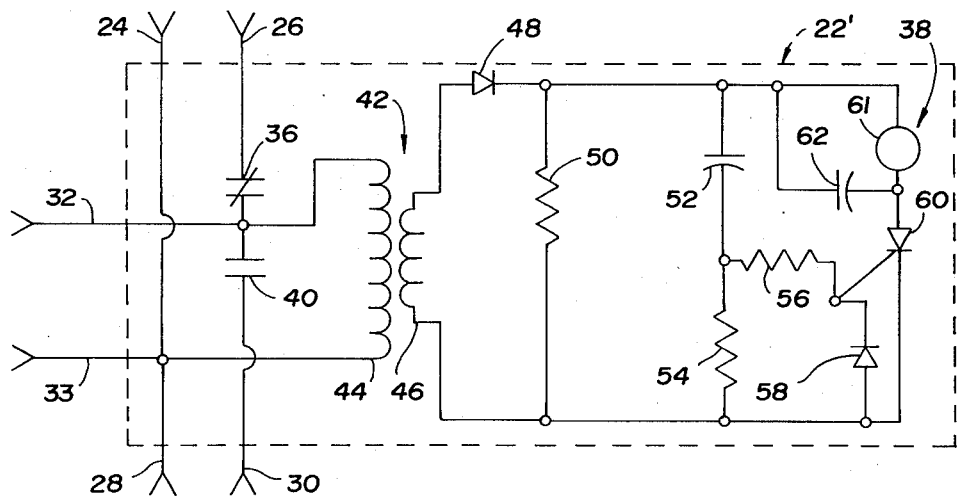
FIG. 2 is an electrical schematic view illustrating a first form of the control circuit.
Figure 3:
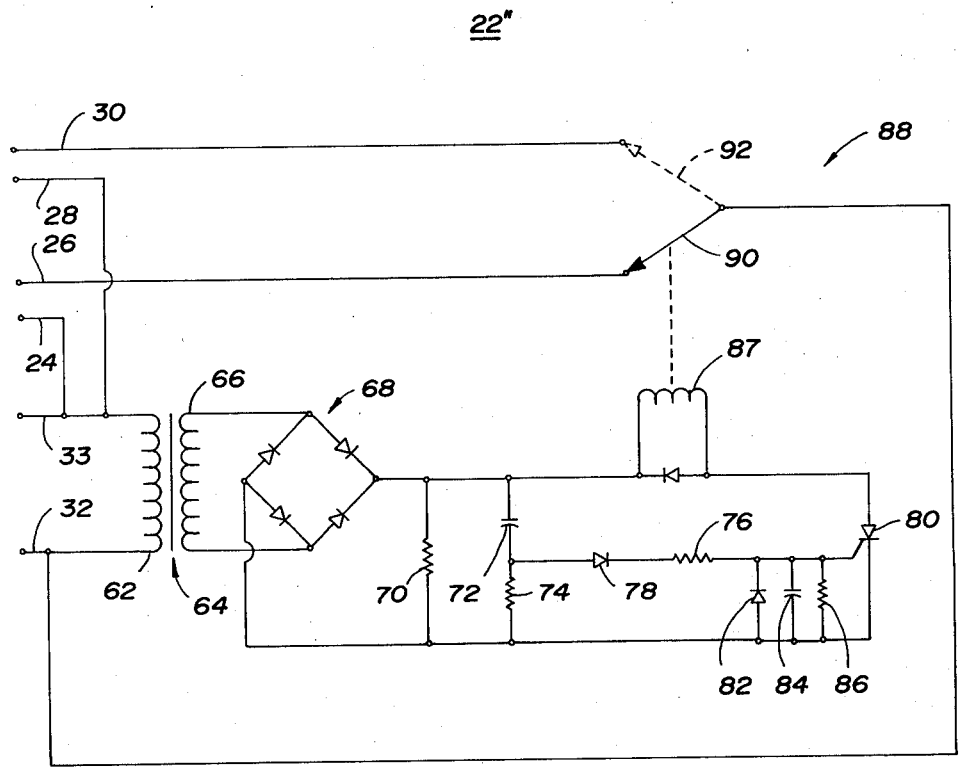
FIG. 3 is an electrical schematic view illustrating a second form of the control circuit.

A control circuit for use in the system 10 is generally indicated at 22 and comprises a power source detector, one form of which is shown at 22' in FIG. 2 and the other form of which is shown at 22" in FIG. 3. The detector 22 is electrically connected or coupled to the HID lamp 18 by means of neutral and "hot" wires 24 and 26, respectively. The detector 22 is also electrically connected to the emergency lamp 20 by means of neutral and "hot" wires 28 and 30, respectively. In general, the detector 22 works in combination with the emergency lamp 20 and the HIP lamp 18 to alternately energize the lamps 18 and 20.

The detector 22 receives input power along input "hot" and common lines 32 and 33 from an emergency power station 34 which under normal operating conditions supplies an AC sine wave signal of about 120 volts. Under normal operating conditions the detector 22 allows the power flowing on lines 32 and 33 to flow to the HID lamp 18 by way of the lines 24 and 26, thereby allowing the HID lamp 18 to remain illuminated.

If the input power to the emergency power station 34 drops below 90 volts AC, the power station 34 switches over to an emergency mode to supply a 120 volt, AC square wave along the lines 32 and 33 which the detector 22 recognizes as an emergency power signal. The detector 22 automatically diverts the incoming power to the emergency lamp 20 along the lines 28 and 30. As long as the input power to the detector 22 remains in the approximate range of 120 to 40 volts AC, the detector 22 will keep the HID lamp 18 "off" and maintain the emergency lamp 20 in its "on" condition.

The emergency power station 34 will continue sending the emergency square wave power signal along lines 32 and 33 to the detector 22 until the emergency condition has been terminated. The power station will thereafter supply the normal sine wave power signal along the lines 32 and 33 which the detector 22 will transfer to the HID lamp 18.

Referring now to FIG. 2, there is disclosed one form of a power source detector indicated at 22' which first determines which one of the power signals, sinusoidal or square wave is being received. The detector 22' then automatically removes the input power from the HID lamp 18 and couples the input emergency power in the form of a square wave to the emergency lamp 20 during emergency operating conditions.

The input line 32 which represents the "hot" line is connected to the normally-closed contacts 36 of a relay 38 which, in turn, is connected to the line 26 leading to the HID lamp 18. The line 32 is also electrically connected to the normally-open contacts 40 of the relay 38 which, in turn, is connected to the line 30 leading to the emergency lamp 20. The input line 33 is electrically connected to the line 24 which leads to the HID lamp 18 and is also connected to the line 28 which leads to the emergency lamp 20.

The detector 22' includes a transformer generally indicated at 42 which includes a primary or primary winding 44 and a second or secondary winding 46. The opposite ends of the primary 44 are connected to the input lines 32 and 33. Current flows in the secondary 46 due to its inductive coupling to the primary 44.

A diode 48 is connected in series with the secondary 46 at its anode to provide half-wave rectification of the alternating current waveform appearing across the input lines 32 and 33. A resistor 50 is connected in parallel across the secondary 46 and the diode 48 at the cathode of the diode 48. The resistor 50 provides a discharge path for a capacitor 52 also connected in parallel across the secondary 46. A second resistor 54 is connected in series with the capacitor 52 and also in parallel across the secondary 46. A third resistor 56 is connected in series with the capacitor 52 and in parallel across the resistor 54. The capacitor 52, the resistor 54 and the resistor 56 form a filter which does not pass sinusoidal waveforms but rather only passes waveforms having a substantially faster rise time than the rise time of a sinusoidal waveform. In other words, the capacitor 52 and the resistors 54 and 56 comprise a filter network which absorbs sinusoidal waveforms appearing across the secondary 46 and passes waveforms having a relatively fast rise time such as a square waveform.

A second diode 58 is connected in series with the resistor 56. The cathode of the diode 58 is electrically connected at one end of the resistor 56 and also to the gate of an SCR (silicon controlled rectifier) 60. The cathode of the diode 56 is also electrically connected to the cathode of the SCR 60 to thereby provide a clamping function for the SCR 60. The SCR 60 is triggered on by a pulse which appears at its gate and stays on until its forward current drops below its holding current. The anode of the SCR 60 is connected to the electromagnetic portion 61 of the relay 38. A capacitor 62 is connected across the electromagnetic portion 61 to eliminate voltage spikes thereacross.

In operation the detector circuit 22' first transforms the input power appearing along the lines 32 and 33 and then provides a halfway rectification of the transformed signal. If the input waveform is a sinusoidal waveform representing normal power conditions, the filter network absorbs the input power. The input power is not passed on to the SCR 60 and, consequently, the relay 38 is not energized. As long as the relay 38 is not energized, the normally-closed contacts 36 convey the input power from the input lines 32 and 33 to the lines 26 and 24 which lead to the HID lamp 18.

The same transformation and rectification occurs when a square wave appears across the input lines 32 and 33 except the filter network allows this input waveform to pass to the gate of the SCR 60 thereby turning the SCR 60 "on". In turn, a potential appears across the electromagnetic portion 61 of the relay 38. As a result, the normally-open contacts 40 of the relay 38 are closed and input voltage appearing across the lines 32 and 33 appears across lines 28 and 30 leading to the emergency lamp 20.

When the square-wave signal no longer appears across the input lines 32 and 33, the SCR 60 is no longer triggered on and, consequently, the relay 38 is no longer energized. As a result, the contacts 40 of the relay 38 open and the contacts 36 close.

Referring to FIG. 3, there is shown a second form of a detector circuit generally indicated at 22". Again, power carried on the input lines 32 and 33 is coupled across the primary 62 of a transformer 64. The output current of the transformer 64 flows through a secondary 66 of the transformer 64 due to the inductive coupling between the primary 62 and the secondary 66. The voltage across the secondary 66 is applied across a full-wave bridge rectifier 68 which rectifies the input signal. The rectified signal is applied across a resistor 70 which is connected in parallel with the bridge rectifier 68. The resistor 70 also serves as a discharge path for a capacitor 72 which is also connected in parallel across the bridge rectifier 68.

Connected in series with the capacitor 72 is a second resistor 74. A third resistor 76 is connected to the cathode of a diode 78, the anode of which is connected to the interconnecting capacitor 72 and the resistor 74 to the diode 78 which isolates and protects the remainder of the circuitry of the detector 22". The capacitor 72, the resistor 74 and the resistor 76 comprise a filter network which discriminates between signals having a fast rise time and signals having a relatively slow rise time such as a sinusoidal signal.

The end of the resistor 76 connected opposite the cathode of the diode 76 is connected to the gate of an SCR 80. The SCR 80 is triggered "on" by a pulse and stays "on" until its forward current drops below its holding current. A second diode 82 is connected across the gate and the cathode of the SCR 80 to protect the SCR gate. Also connected across the gate and the cathode of the SCR 80 is a clamping circuit comprising a capacitor 84 and a resistor 86 which are connected in parallel to limit the response of the SCR to transient signals to stabilize the operation of the SCR 80.

The electromagnetic portion 87 of a relay 88 is connected in series with the SCR 80. The contacts of the relay 88 have a normally-closed position as indicated at 90 and a normally-open position as indicated at 92. When the SCR is not "on", the relay 88 is not energized. In this condition the input power appearing on the input lines 32 and 33 is transferred to the lines 24 and 26 leading to the HID lamp 18. The situation occurs when the sinusoidal waveform is introduced on the input line 32 and 33. This waveform is transformed and rectified. However, the filter network absorbs the energy contained in the sinusoidal waveform and, consequently, the SCR 80 is not triggered "on", thereby keeping the relay 88 in its unenergized state.

When a waveform appears in the input line 32 and 33 having a relatively short rise time compared with the rise time of a sinusoidal waveform, the waveform is again transferred and rectified. However, the filter network allows the relatively fast rising waveform to pass through to trigger the gate of the SCR 80 which stays on until its forward current drops below its holding current.

When the SCR 80 is triggered "on" the relay 88 is energized thereby causing the relay 88 to move to its normally-open position 92. In the normally-open position 92, the input waveform, which is preferably a square waved form, is transferred from the input line 32 and 33 to the lines 28 and 30 leading to the emergency lamp 20. Both the detector 22' and the detector 22" detect emergency power, in this case a square waveform, which has different characteristics than the characteristics of the normal input waveform (i.e. having a sinusoidal shape) to switch the lighting load of the HID lamp 18 to the emergency lamp 20. In this way emergency lighting may be provided from a single power source, such as the power station 34 in the absence of normal operating power.

While a pair of embodiments of the invention have been shown herein in detail, those skilled in this art will recognize various alternative designs and embodiments for practicing the present invention as defined by the following claims.

What is claimed is:

1. In a system for providing normal and emergency lighting from a single source of electrical power capable of providing input power alternately in the form of a normal power signal and an emergency power signal during interruption of the normal power signal, the system including a first lamp capable of being energized by the normal power signal and an emergency lamp capable of being energized by the emergency power signal, a control circuit adapted to alternately receive the normal and emergency power signals, said control circuit comprising:
    a detection circuit for determining which one of said power signals is being received, and
    an electrically controlled switching circuit coupled to said detection circuit for selectively and automatically removing input power from the first lamp and coupling the input power to the emergency lamp during emergency operating conditions.

2. The circuit as claimed in claim 1 wherein the normal power signal comprises a sinusoidal signal having a first rise time and the emergency power signal has a rise time less than the first rise time and wherein the detection circuit includes a filter network for passing a portion of the emergency power signal to operate the switching circuit and for blocking the sinusoidal signal.

3. The circuit as claimed in claim 2 wherein said control circuit includes a transformer for transforming the input power to a lower level.

4. The circuit as claimed in claim 3 wherein each of said power signals comprises an alternating current, periodic wave form and wherein said control circuit includes a rectifier coupled to said transformer for converting the alternating current to a unidirectional current.

5. The circuit as claimed in claim 2 or claim 4 wherein said switching circuit includes an electrically controlled bistable device and a relay connected in series with said device, the filtered emergency power signal causing the device to conduct to, in turn, cause the relay to automatically connect the emergency power signal to the emergency lamp.

6. The circuit as claimed in claim 5 wherein said device comprises a silicon controlled rectifier and wherein said circuit includes a clamping circuit connected in parallel across the gate and the cathode of the silicon controlled rectifier for providing a fixed bias at the gate of the silicon controlled rectifier.

7. A system for providing normal and emergency lighting from a single source of electrical power capable of providing input power alternately in the form of a normal power signal and an emergency power signal during interruption of the normal power signal; the system comprising:
    a high intensity discharge lamp capable of being energized by the normal power signal, an emergency lamp capable of being energized by the emergency power signal, and a control circuit adapted to alternately receive the normal and emergency power signals, said control circuit including a detection circuit for determining which one of said power signals is being received and an electrically controlled switching circuit coupled to said detection circuit for selectively and automatically coupling the input power to the first lamp during normal operating conditions and removing the input power from the high intensity discharge lamp and coupling the power to the emergency lamp during emergency operating conditions.

8. The system as claimed in claim 7 wherein said emergency lamp comprises one of a quartz lamp and a tungsten halogen lamp.

9. The system as claimed in claim 7 or claim 8 including a fixture for housing the lamps.

* * * * *